June 26, 1956  A. R. GRAD  2,751,670
BUSHING ASSEMBLY PRESS
Filed Dec. 30, 1950  2 Sheets-Sheet 1
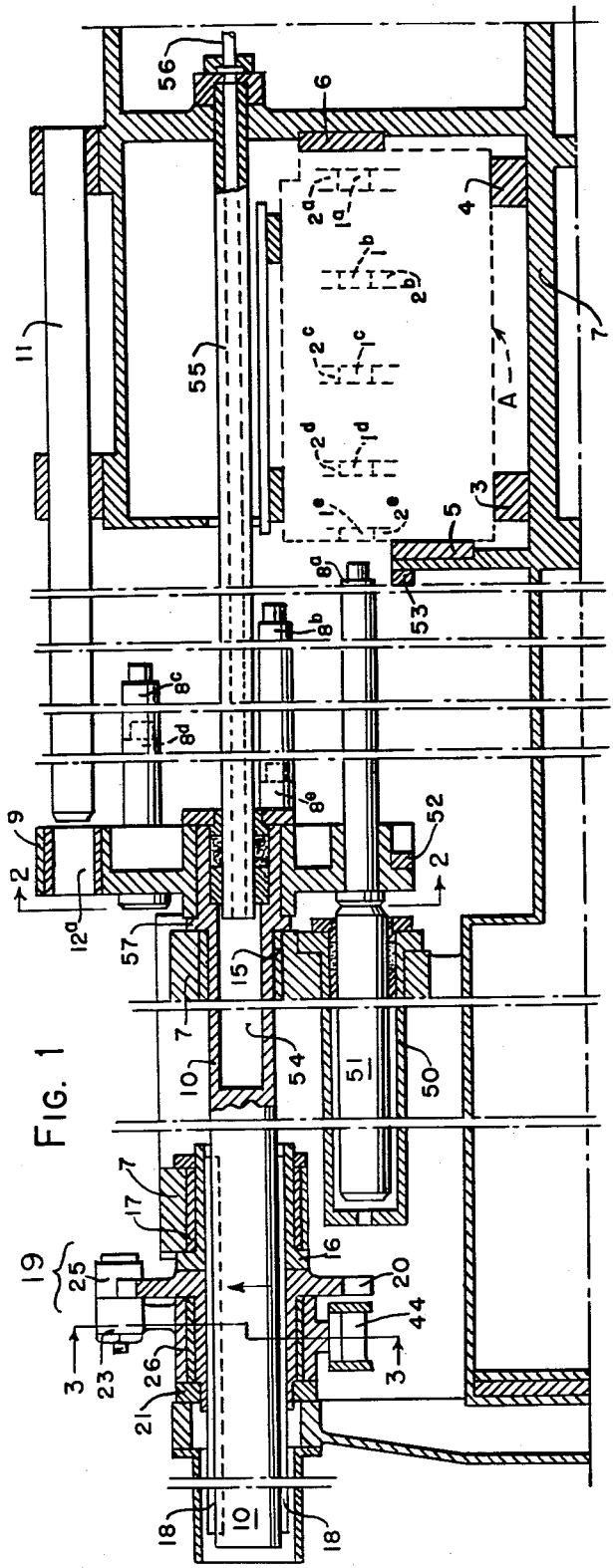
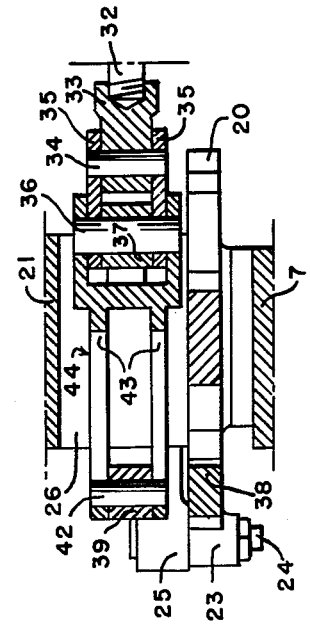
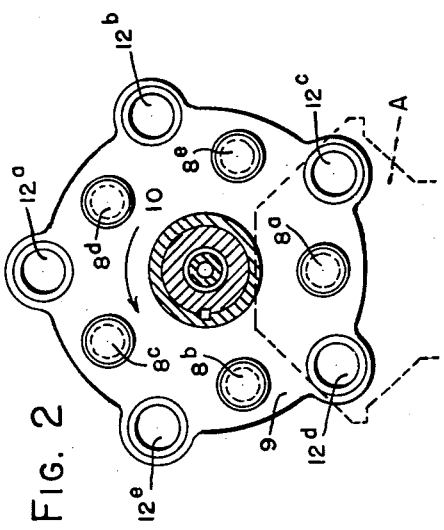
INVENTOR.
ADOLF R. GRAD
BY
Wesley P. Merrill
ATTORNEY June 26, 1956  A. R. GRAD  2,751,670
BUSHING ASSEMBLY PRESS
Filed Dec. 30, 1950  2 Sheets-Sheet 2
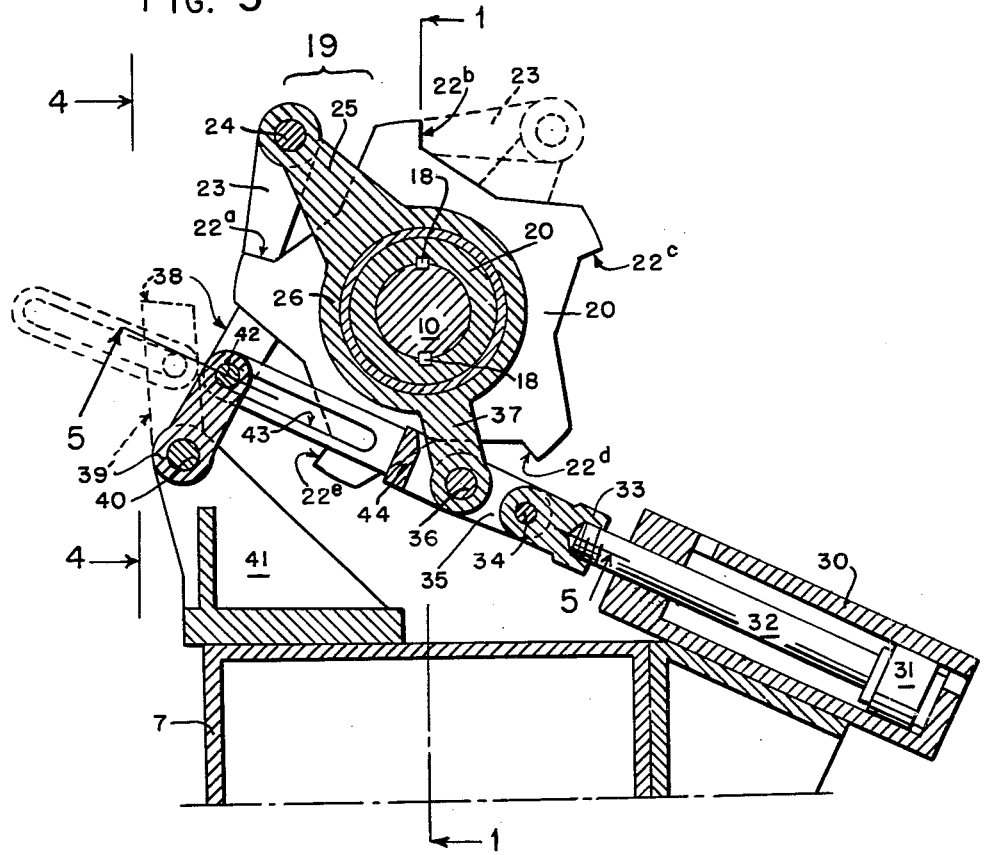
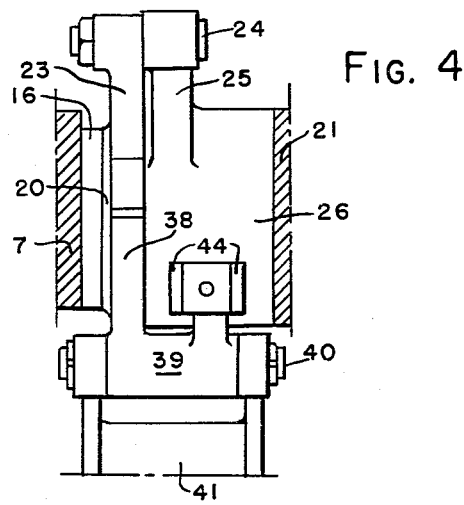
INVENTOR.
ADOLF R. GRAD
BY Wesley P. Merrill
ATTORNEY

United States Patent Office 2,751,670
Patented June 26, 1956

2,751,670

BUSHING ASSEMBLY PRESS

Adolf R. Grad, Wauwatosa, Wis., assignor to The Oilgear Company, Milwaukee, Wis., a corporation of Wisconsin Application December 30, 1950, Serial No. 203,721

9 Claims. (Cl. 29—252)

This invention relates to machines for pressing bushings into a plurality of bores which are arranged in axial alinement. A machine embodying the invention is particularly adapted for pressing camshaft bushings into the motor blocks of gasoline motors and the invention will be explained as embodied in such a machine but it is to be understood that machines embodying the invention may be employed for other purposes.

Intake and exhaust valves of a gasoline motor are operated by a camshaft which is journaled in bearing bushings carried by webs which are integral parts of the motor block. Camshaft bushings ordinarily are pressed into the webs by means of a horn press but the use of such a press requires that adjacent webs be spaced a substantial distance apart.

The present invention has as an object to provide a machine which will press bushings into axially alined bores regardless of the distance between adjacent bores so that, when a machine embodying the invention is employed to press camshaft bushings into a motor block, the block may be provided with as many bushings as are required to prevent deflection or vibration of the camshaft and the length of the block be kept at a minimum.

Another object is to provide a machine of the above type in which the pressing force is applied directly upon the axis of the bores into which bushings are to be pressed.

Another object is to provide a machine of the above type having a ram for pressing a bushing into a bore and means for positively locating the axis of the ram upon the axis of the bore.

Another object is to provide a machine of the above type having a plurality of rams for pressing an equal number of bushings into bores which are arranged in axial alinement, means for indexing the several rams to bring one ram after another into axial alinement with the bores, and means for positively locating the axis of the ram in alinement with the bores upon the axis of the bores.

Another object is to provide a machine of the above type having a plurality of rams carried by a rotatable index element and means which will rotate the index element from one position to a new position, stop it in the new position and which during the stopping of the element will function as a shock absorber to absorb the energy of the rotating mass.

Other objects and advantages will appear from the following description of a machine embodying the invention and shown somewhat diagrammatically in the accompanying drawings in which the views are as follows:

Fig. 1 is a vertical longitudinal section through the machine taken substantially in the plane indicated by the line 1—1 of Fig. 3, certain parts being broken away or omitted in order to show the machine on as large a scale as possible.

Fig. 2 is a transverse section taken on the line 2—2 of Fig. 1.

Fig. 3 is a transverse section showing details of an indexing mechanism and taken on the irregular line 3—3 of Fig. 1 but drawn to a larger scale.

Fig. 4 is a view taken on the line 4—4 of Fig. 3 and showing a part of the indexing mechanism in elevation.

Fig. 5 is a view taken on the line 5—5 of Fig. 3.

For the purpose of illustration, the invention has been shown embodied in a machine for pressing camshaft bushings into the blocks of V-type motors, one of the blocks being indicated in dotted lines and designated by the reference character A in Figs. 1 and 2. The machine is adapted to press a bushing into each of five axially alined bores $1^a$, $1^b$, $1^c$, $1^d$ and $1^e$ formed, respectively, in webs $2^a$, $2^b$, $2^c$, $2^d$ and $2^e$ which are integral parts of the motor block. Motor blocks A are passed in succession through the machine upon two rails 3 and 4 and between two guides 5 and 6 carried by a frame 7 which also carries the mechanism of the machine.

Bore $1^a$ is enough larger in diameter than the camshaft to receive a bushing of the desired wall thickness and bore $1^b$ is enough larger than bore $1^a$ to permit free passage therethrough of the bushing which is to be pressed into bore $1^a$. Similarly, bore $1^c$ is larger than bore $1^b$, bore $1^d$ is larger than bore $1^c$ and bore $1^e$ is larger than bore $1^d$.

Bushings are pressed into bores $1^a$, $1^b$, $1^c$, $1^d$ and $1^e$ by five rams $8^a$, $8^b$, $8^c$, $8^d$ and $8^e$, respectively, having the left end portions thereof fixed in a turret 9 which is fastened upon the right end of a shaft 10. An end portion of each ram 8 has a diameter slightly less than the internal diameter of a bushing, so that a bushing may be slipped thereon by the operator, and the adjacent portion of the ram is larger in diameter to provide a shoulder against which the bushing bears while being pressed into a bore 1 but the maximum diameter of the ram is less than the diameter of the bore 1 preceding the bore 1 into which the bushing is to be pressed. The several rams 8 are equally spaced upon a circle having a radius equal to the distance between the axis of shaft 10 and the centers of bores 1. As will presently be explained, turret 9 is adapted to be intermittently rotated to bring the several rams successively into alinement with the bores and it is adapted to be advanced to enable whichever ram is in alinement with the bores to press a bushing into one of the bores.

In order to insure that each ram 8 after being indexed into position to press a bushing into a bore is in exact alinement with bores 1 before it starts to press a bushing into a bore, a guide bar 11 is fixed to frame 7 above block A with its axis in the same vertical plane as the axis of bores 1. Turret 9 is provided with five guide bores $12^a$, $12^b$, $12^c$, $12^d$ and $12^e$ which are located diametrically opposite to rams $8^a$, $8^b$, $8^c$, $8^d$ and $8^e$ respectively. The arrangement is such that, after turret 9 has been advanced a short distance, bar 11 will enter the guide bore 12 which is opposite the ram 8 which is to press a bushing into bore 1 and will hold the axis of that ram exactly upon the axis of bores 1.

Shaft 10 is adapted to rotate and to slide in a bearing 15, which is carried by frame 7, and it is slidably fitted in a bushing 16 which is journaled in a bearing 17 carried by frame 7. Bushing 16 is restrained from axial movement by frame 7 and it is fixed for rotation with shaft 10 as by means of two long keys 18.

Intermittent rotation of shaft 10 is effected by means of an indexing mechanism 19 including a ratchet wheel 20 which is slidably fitted upon shaft 10 and is fixed for rotation therewith as by means of the two long keys 18. The left end of the hub of ratchet wheel 20 is journaled in a bearing 21 which is carried by frame 7. Bearing 21 and bushing 16 prevent ratchet wheel 20 from moving axially.

Ratchet wheel 20 has five equally spaced teeth 22ª, 22ᵇ, 22ᶜ, 22ᵈ and 22ᵉ which are adapted to be engaged successively by a pawl 23 pivoted by a pin 24 to the outer end of an arm 25 of a pawl carrier 26 which is journaled upon the hub of ratchet wheel 20, a suitable bushing preferably being fitted between the hub of carrier 26 and the hub of ratchet wheel 20. Bearing 21 prevents pawl carrier 26 from moving off the hub of ratchet wheel 20.

Pawl carrier 26 is adapted to be rotated through a limited angular distance in opposite directions alternately by a hydraulic motor having its cylinder 30 fixed to frame 7 and its piston 31 fitted in cylinder 30 and provided with a rod 32 which extends through one end of cylinder 30 and has a connector 33 fixed upon its outer end. Connector 33 has a pin 34 inserted therein and connected by two links 35 to a pin 36 inserted through a second arm 37 of pawl carrier 26.

The arrangement is such that, when motive liquid is supplied to the head end of cylinder 30, piston 31 will be advanced and will cause pawl carrier 26 to be rotated upon the hub of ratchet wheel 20 in a clockwise direction in respect to Fig. 3 until piston 31 stalls against the rod end of cylinder 30 at which time arm 25 and pawl 23 will have been rotated far enough to permit pawl 23 to drop behind the uppermost tooth 22 of ratchet wheel 20 as indicated in dotted lines in Fig. 3.

Then when motive liquid is supplied to the rod end of cylinder 30, piston 31 will be retracted and will cause pawl carrier 26 to be rotated in a counterclockwise direction in respect to Fig. 3 until piston 31 stalls against the head end of cylinder 30. Pawl 23 will engage the uppermost tooth 22 and will cause ratchet wheel 20 to rotate with pawl carrier 26. Since shaft 10 is fixed for rotation with ratchet wheel 20 and since turret 9 is fixed for rotation with shaft 10, turret 9 will be rotated through the same angular distance as ratchet wheel 20. When piston 31 stalls against the head end of cylinder 30, a ram 8 will have been rotated into alinement with bores 1. For example, if pawl 23 is in contact with tooth 22ª as shown in Fig. 3, ram 8ª will be in alinement with bores 1 as shown in Figs. 1 and 2 when piston 31 is against the head end of cylinder 30.

Turret 9 and ratchet wheel 20 are rotated at high speed and would overrun the position in which a ram 8 is in alinement with bores 1 unless preventative means were provided. As shown, the ratchet wheel tooth 22 having one face thereof in engagement with pawl 23 has the opposite face thereof in engagement with a stop 38 when the ram 8 corresponding to that tooth 22 is in alinement with bores 1. Stop 38 is moved into and out of contact with teeth 22 by a motor 30—32 and it may be connected thereto by any suitable mechanism. As shown, stop 38 is formed integral with the hub of a lever 39 which is mounted upon a pin 40 carried by a bracket 41 which forms a part of frame 7. The free end of lever 39 has a pin 42 fixed therein with its ends fitted in two slots 43 which are formed in opposite sides of an end portion of a bifurcated link 44 the other end of which is mounted upon the ends of the pin 36 which connects arm 37 to links 35.

The arrangement is such that, when motor 30—32 rotates pawl carrier 26 in a clockwise direction as explained above, link 44 will move toward the left in respect to Fig. 3 but stop 38 will remain in contact with a tooth 22 until the ends of slots 43 engage pin 42 and then link 44 will swing lever 39 upon pin 40 and thereby move stop 38 into the position indicated in dotted lines in Fig. 3 in which position it is yieldingly held such as by means of a spring detent which does not appear in the drawings.

Then when motor 30—32 rotates pawl carrier 26 and ratchet wheel 20 in a counterclockwise direction in respect to Fig. 3 as explained above, link 44 will move toward the right in respect to Fig. 3 but stop 38 will remain in its dotted line position until the ends of slots 43 engage pin 42 and then link 44 will swing lever 39 upon pin 40 and thereby move stop 38 into the position shown in full lines in Fig. 3. At the instant that stop 38 arrives in that position, ratchet wheel 20 arrives in a position in which a ram 8 is in alinement with the bores 1 in motor block A and stop 38 resists further rotation of ratchet wheel 20 but the inertia of the rotating mass is so great that too great a shock would occur if rotation were stopped instantaneously.

Therefore, the end of stop 38 and the contact surfaces on teeth 22 which are engaged by stop 38 are beveled to such a degree that the contact end of stop 38 will be forced a short distance outward or toward the left in respect to Fig. 3 by a component of the rotative force. In moving outward, stop 38 will move piston 31 toward the rod end of cylinder 30 against the pressure in cylinder 30 which will resist that movement of piston 31 and thereby quickly and smoothly decelerate the rotating parts and will then return stop 38 to the position shown in full lines in which position a tooth 22 of ratchet wheel 20 is locked between pawl 23 and stop 38. Motor 30—32 thus has the dual function of rotating ratchet wheel 20 and acting as a shock absorber to absorb the energy stored in the rotating mass.

After ratchet wheel 20 has been rotated into a position in which a ram 8 is in alinement with the bores in motor block A, turret 9 is advanced to enable that ram to press a bushing into a bore 1 and then it is retracted. Since shaft 10 is fixed to turret 9, it will be advanced and retracted therewith and will slide through bearing 15, bushing 17 and ratchet wheel 20. Turret 9 may be advanced and retracted by any suitable motor means. As shown, turret 9 is advanced by one single acting hydraulic motor and is retracted by another single acting hydraulic motor the cylinder of which is formed in shaft 10.

The motor for advancing turret 9 has its cylinder 50 fixed to frame 7 in axial alinement with the bores 1 in motor block A and its plunger 51 fitted in cylinder 50 and adapted to engage the head of the ram 8 which is in alinement with the bores 1. When motive liquid is supplied to cylinder 50, plunger 51 will act upon the end of the ram 8 which is in alinement with bores 1 and will advance turret 9 until a stop 52 carried by turret 9 engages a stop 53 carried by frame 7, a stop 52 being arranged radially outward from each of the rams 8. Turret 9 is thus stalled at exactly the same point each time it is advanced.

The several rams 8 are of different lengths and the length of each is such that, when turret 9 stalls against stop 53, the ram 8 in alinement with bores 1 will have pressed a bushing to the proper position within the bore indicated by the reference numeral 1 having the same exponent as the reference numeral 8 of that ram. For example, when ram 8ª is in alinement with bores 1, the proper bushing has been placed upon the end of ram 8ª and motive liquid is supplied to cylinder 50, plunger 51 will act upon the head end of ram 8ª and will advance turret 9 until it stalls against stop 53 at which time ram 8ª will have pressed the bushing to the proper position within bore 1ª. The arrangement is such that the force for pressing a bushing into a bore is applied directly upon the axis of the ram which does the pressing.

The motor for retracting turret 9 has been shown as including a cylinder 54, which is formed in shaft 10, and an elongated tubular plunger 55 which has its left end portion inserted into cylinder 54 and its right end rigidly secured to frame 7 and provided with means for connecting a pipe 56 thereto. The right end of cylinder 54 is provided with suitable guide means for supporting the left end portion of plunger 55 and with suitable packing means for preventing escape of liquid from cylinder 54 except through plunger 55 and pipe 56. When turret 9 is in its advanced position and motive liquid is supplied to cylinder 54 through plunger 55 and pipe 56, the liquid will act upon the opposed ends of cylinder 54 and plunger 55 and will move shaft 10 and turret 9 toward the left until a flange 57 on shaft 10 engages the portion of frame 7 which carries bearing 15.

Turret 9 preferably is advanced at high speed until the bushing carried by the ram 8 in alinement with bores 1 reaches a point close to the bore 1 into which it is to be pressed, then turret 9 is advanced at slow speed until the bushing is pressed into place and then turret 9 is retracted at high speed. This may be accomplished by providing the machine with a plurality of pumps (not shown) for supplying liquid to energize the several hydraulic motors and with an electric circuit (not shown) for controlling the machine, directing liquid from two pumps to a motor to effect high speed operation thereof and directing liquid from only one pump to the motor to effect slow speed operation thereof.

*Operation*

As previously stated, motor blocks A are passed through the machine one after another to have camshaft bushings inserted therein. The machine has a pressing station at which camshaft bushings are pressed into a block as indicated in Fig. 1, a loading station at one side of the pressing station and an unloading station at the other side of the pressing station.

The mechanism for passing motor blocks through the machine includes transfer dogs for engaging the sides of the blocks, a transfer mechanism for moving the dogs and the blocks from one station to another, a stop adapted to be advanced into the path of a block being placed at the loading station to stop that block in a position in which it can be engaged by a transfer dog, and dowels which enter locating holes in the motor block at the pressing station and accurately locate that block in position to have camshaft bushings pressed into it.

When the machine stops after pressing all of the camshaft bushings into the block at the pressing station, the dowels are in the locating holes in that block, the stop is in its advanced or block stopping position, the transfer dogs are retracted below the blocks, the transfer mechanism is retracted, turret 9 is in the position shown in Figs. 1 and 2 and piston 31 is against the head end of cylinder 30 so that a tooth of ratchet wheel 20 is locked between pawl 23 and stop 38 as shown in full lines in Fig. 3.

Assuming that camshaft bushings have been pressed into the motor block at the pressing station, that the parts are in the positions mentioned above, that a motor block has been moved against the stop at the loading station and that the operator has placed the proper bushing upon the end of each of ram 8, a cycle of operations may be started by pressing the starting switch (not shown) which will cause the transfer dogs to be raised into position to move the block, the stop to be retracted out of the path of the block at the loading station, and the dowels to be retracted from the locating holes in the block at the pressing station. Then the transfer mechanism will move the dogs from one station to another and thereby move the block containing bushings from the pressing station to the unloading station and the unbushed block from the loading station to the pressing station. The transfer mechanism is operated by a hydraulic motor the piston of which will stall against the end of its cylinder when the motor block which was at the loading station has been moved into substantially the correct position at the pressing station.

When the transfer motor stalls, the transfer dogs will be retracted below the blocks, the stop will be advanced into block stopping position, the dowels will be inserted into locating holes in the block at the pressing station to accurately locate that block in position to have bushings pressed into it, and then the transfer mechanism will be retracted.

The mechanism for inserting the dowels operates a switch which causes liquid from two pumps to flow to cylinder 50 and enable plunger 51 to advance turret 9 at high speed. Operation of the switch also causes liquid to be directed to the head end of cylinder 30 and enables piston 31 to rotate pawl carrier 26 and thereby move pawl 23 into the position shown in dotted lines in Fig. 3. Turret 9 will advance at high speed until the bushing carried by ram 8ª reaches a point close to bore 1ª at which point a switch is operated to cause the larger of the two pumps to be bypassed and ram 8ª to be advanced and to press the bushing into bore 1ª at slow speed due to motor 50—51 being supplied with liquid by only the smaller of the two pumps.

When the bushing has been pressed to the proper position in bore 1ª, turret 9 will stall against stop 53 which will cause cylinder 50 to be connected to exhaust and the liquid from both pumps to flow through pipe 56 and plunger 55 into cylinder 54 and retract shaft 10 and turret 9 at high speed to its initial position at which time collar 57 on shaft 10 stalls against frame 7. Then liquid is supplied to the head end of cylinder 30 and causes piston 31 to rotate ratchet wheel 20 and turret 9 through one-fifth of a revolution to bring ram 8ᵇ into alinement with bores 1.

As soon as ram 8ᵇ has been rotated into pressing position, turret 9 is advanced first at high speed and then at slow speed to enable ram 8ᵇ to press the bushing thereon into bore 1ᵇ and then turret 9 is retracted and then indexed in the above described manner to bring ram 8ᶜ into pressing position. Thereafter, turret 9 is successively advanced, retracted and indexed until rams 8ᶜ, 8ᵈ and 8ᵉ have pressed the bushings thereon into bores 1ᶜ, 1ᵈ and 1ᵉ respectively. When turret 9 is fully retracted after ram 8ᵉ has pressed a bushing into bore 1ᵉ, turret 9 will be indexed to its initial position and the machine will stop. A new cycle of operations may then be initiated by again closing the starting switch.

The invention described herein may be embodied in other forms and adapted to other uses without departing from the scope of the invention which is hereby claimed as follows:

1. In a machine for pressing a bushing into each of a plurality of axially alined bores, the combination of a support for holding in a stationary position a work piece having a plurality of bores formed therein in axial alinement and spaced from each other, a turret rotatably and slidably supported by said support with its axis of rotation spaced from the axis of said bores, a plurality of rams of various lengths fixed to said turret and having a bushing supporting portion on the free end of each ram, said rams being equal in number to said bores and of such lengths that when the bushing supporting portion of one ram is within one of said bores the bushing supporting portions of the other rams are in radial alinement with the other bores respectively, means for indexing said turret to successively position said rams in axial alinement with said bores, means arranged upon the axis of said bores for exerting upon the axis of the ram in alinement with said bores a force for advancing said turret to enable that ram to press a bushing into one of said bores, and means operable after a bushing has been pressed into a bore for effecting retraction of said turret.

2. In a machine for pressing a bushing into each of a plurality of axially alined bores, the combination of a support for holding in a stationary position a work piece having a plurality of bores formed therein in axial alinement and spaced from each other, a turret rotatably and slidably supported by said support with its axis of rotation spaced from the axis of said bores, a plurality of rams of various lengths fixed to said turret and having a bushing supporting portion on the free end of each ram, said rams being equal in number to said bores and of such lengths that when the bushing supporting portion of one ram is within one of said bores the bushing supporting portions of the other ram are in radial alinement with the other bores respectively, means for indexing said turret to successively position said rams in axial alinement with said bores, a reciprocating hydraulic motor arranged in axial alinement with said bores and adapted when energized to exert upon the axis of the ram in alinement with said bores a force to advance said turret and enable that ram to press a bushing into one of said bores, and hydraulic means for retracting said turret.

3. A combination according to claim 1 which includes a guide bar fixed in a stationary position and having an end thereof spaced from said turret when said turret is fully retracted and in which said turret is provided with a plurality of guide holes so located that during advance of said turret said guide bar will enter one of said holes and cause whichever one of the rams is in alinement with said bores to have its axis accurately positioned upon the axis of said bores.

4. A combination according to claim 2 which includes a stationary guide bar arranged upon the opposite side of the axis of said turret from said bores with its axis in the same plane as the axes of said turret and said bores and having an end thereof spaced from said turret when said turret is fully retracted and in which said turret has a guide hole arranged therein diametrically opposite each of said rams and spaced from the turret axis the same distance said guide bar is spaced therefrom so that during advance of said turret said guide bar will enter the guide hole diametrically opposite a ram which is in alinement with said bores and will accurately position the axis of that ram upon the axis of said bores.

5. A combination according to claim 2 which includes a guide bar fixed in a stationary position and having an end thereof spaced from said turret when said turret is fully retracted and in which said turret is provided with a plurality of guide holes so located that during advance of said turret said guide bar will enter one of said holes and cause whichever one of the rams is in alinement with said bores to have its axis accurately positioned upon the axis of said bores.

6. In a machine for pressing a bushing into each of a plurality of alined bores, the combination of a support for holding in a stationary position a work piece having a plurality of bores formed therein in axial alinement and spaced from each other, a plurality of stationary bearings carried by said support, a shaft rotatably and slidably supported in said bearings and having its axis parallel to and spaced from the axis of said bores, a turret fixed to said shaft, said turret having fixed thereto a plurality of rams equal in number to said bores for pressing bushings into said bores selectively, means including a ratchet wheel which is splined upon said shaft and is restrained from axial movement for indexing said shaft and said turret to successively position said rams in axial alinement with said bores, means arranged upon the axis of said bores for exerting upon the axis of the ram in alinement with said bores a force for advancing said turret to enable that ram to press a bushing into one of said bores, and means operable after a bushing has been pressed into a bore for effecting retraction of said turret.

7. A combination according to claim 6 which includes a stationary stop to be engaged by said turret and thereby stop said turret at the same point each time it is advanced and in which each of said rams has at the free end thereof a portion to support a bushing and the lengths of said rams are such that when said turret is in engagement with said stop the bushing supporting portion on one ram will be within one of said bores and the bushing supporting portions on the other rams will be in radial alinement with the other of said bores respectively.

8. A combination according to claim 7 which includes a guide bar fixed in a stationary position and having an end thereof spaced from said turret when said turret is fully retracted and in which said turret is provided with a plurality of guide holes so located that during advance of said turret said guide bar will enter one of said holes and cause whichever one of the rams is in alinement with said bores to have its axis accurately positioned upon the axis of said bores.

9. A combination according to claim 6 in which said force exerting means is a reciprocating hydraulic motor arranged upon the axis of said bores and said retracting means is a hydraulic motor including a cylinder which is formed in said shaft and a tubular plunger which extends into said cylinder and is fixed in a stationary position.

References Cited in the file of this patent

UNITED STATES PATENTS

| 1,636,642 | Lormor | July 19, 1927 |
| 1,673,078 | Kampton et al. | June 12, 1928 |
| 1,690,419 | McCain | Nov. 6, 1928 |
| 1,760,989 | Lewis | June 3, 1930 |
| 1,783,637 | Tweddell | Dec. 2, 1930 |
| 1,964,351 | Haas | June 26, 1934 |
| 1,987,862 | Morgan | Jan. 15, 1935 |
| 2,118,021 | Curtis | May 17, 1938 |
| 2,166,716 | Chandler | July 18, 1939 |
| 2,592,821 | Powell | Apr. 15, 1952 |